(12) United States Patent
Hosoi et al.

(10) Patent No.: US 8,542,941 B2
(45) Date of Patent: Sep. 24, 2013

(54) IMAGING DEVICE, IMAGE DETECTING METHOD AND FOCUS ADJUSTING METHOD

(75) Inventors: Kazuma Hosoi, Narashino (JP); Hiroyuki Iwasaki, Yokohama (JP)

(73) Assignee: Nikon Corporation, Tokyo (JP)

( * ) Notice: Subject to any disclaimer, the term of this patent is extended or adjusted under 35 U.S.C. 154(b) by 1019 days.

(21) Appl. No.: 12/219,517

(22) Filed: Jul. 23, 2008

(65) Prior Publication Data

US 2009/0028394 A1   Jan. 29, 2009

(30) Foreign Application Priority Data

Jul. 24, 2007  (JP) ................................ 2007-192182

(51) Int. Cl.
    *G06K 9/40* (2006.01)
(52) U.S. Cl.
    USPC .......................................................... 382/255
(58) Field of Classification Search
    USPC .................. 382/118, 181, 103, 255; 396/95;
    348/345
    See application file for complete search history.

(56) References Cited

U.S. PATENT DOCUMENTS

| 7,251,056 B2 | 7/2007 | Matsushima |
| 7,728,903 B2 * | 6/2010 | Ohnishi .......................... 348/345 |
| 7,869,704 B2 * | 1/2011 | Uenishi ............................ 396/95 |
| 2004/0207743 A1 * | 10/2004 | Nozaki et al. ............. 348/333.12 |
| 2006/0267763 A1 * | 11/2006 | Rao ................................ 340/541 |
| 2007/0122034 A1 * | 5/2007 | Maor ............................ 382/181 |

FOREIGN PATENT DOCUMENTS

| JP | A-2003-156680 | 5/2003 |
| JP | A-2003-344891 | 12/2003 |
| JP | A-2004-185555 | 7/2004 |
| JP | A-2007-010898 | 1/2007 |
| JP | A-2009-33238 | 2/2009 |

OTHER PUBLICATIONS

Aug. 2, 2011 Office Action issued in Japanese Patent Application No. 2007-192182 (with translation).
Office Action issued in Japanese Patent Application No. 2011-288826 dated Mar. 12, 2013 (with translation).

* cited by examiner

*Primary Examiner* — Claire X Wang
(74) *Attorney, Agent, or Firm* — Oliff & Berridge, PLC (57) ABSTRACT

An imaging device includes: an image pickup device that captures an image via an imaging optics; a focus detector that detects a focus adjustment state of the imaging optics; a face detection circuit that detects an image corresponding to a face of a person from the image captured by the image pickup device; and a controller that causes the face detection circuit to execute detection of the image corresponding to the face, according to a focus detection result of the focus detector.

21 Claims, 8 Drawing Sheets

IMAGING DEVICE, IMAGE DETECTING METHOD AND FOCUS ADJUSTING METHOD

INCORPORATION BY REFERENCE

The disclosure of the following priority application is herein incorporated by reference: Japanese Patent Application No. 2007-192182 filed Jul. 24, 2007

BACKGROUND OF THE INVENTION

1. Field of the Invention

The present invention relates to an imaging device, an image detecting method and a focus adjusting method.

2. Description of Related Art

A method for detecting face region is disclosed in Laid-open Publication No. 2004-185555 of Japanese Patent Application. The disclosed method includes the steps of: analyzing captured image data so as to detect regions having a hue of human skin (which will be called "skin colored regions"), obtaining the focal length of an image forming optical system so as to estimate the maximum size of faces of which a picture is actually taken, and excluding regions that are larger in size than the maximum face size from the skin colored regions, so as to detect a face region or regions.

SUMMARY OF THE INVENTION

In the known face region detecting method as described above, however, the size of a face of a person cannot be correctly estimated unless the image forming optical system is in focus for the face, which may cause a problem that the corresponding face region cannot be accurately detected.

According to the first aspect of the present invention, an imaging device comprises: an image pickup device that captures an image via an imaging optics; a focus detector that detects a focusing condition of the imaging optics; a face detection circuit that detects an image corresponding to a face of a person from the image captured by the image pickup device; and a controller that causes the face detection circuit to execute detection of the image corresponding to the face, depending on a focus detection result of the focus detector.

According to the second aspect of the present invention, it is preferred that the imaging device according to the first aspect of the invention further comprises: a focus determination circuit that determines whether or not the focusing condition is assumed to be achieved in focus, and in this imaging device the controller causes the face detection circuit to execute detection of the image corresponding to the face when the focus determination circuit determines that the focusing condition is assumed to be achieved in focus.

According to the third aspect of the present invention, it is preferred that in the imaging device according to the second aspect of the invention, the controller performs an operation different from detection of the image corresponding to the face performed by the face detection circuit, until the focus determination circuit determines that the focusing condition is assumed to be achieved in focus.

According to the forth aspect of the present invention, it is preferred that the imaging device according to the third aspect of the invention further comprises: a background detecting circuit that detects an image corresponding to a background, from the image captured by the image pickup device, and in this imaging device the controller causes the background detection circuit to execute detection of the image corresponding to the background, until the focus determination circuit determines that the focusing condition is assumed to be achieved in focus.

According to the fifth aspect of the present invention, it is preferred that the imaging device according to the second aspect, further comprises: a background detection circuit that detects an image corresponding to a background, from the image captured by the image pickup device, and in this imaging device when the focus determination circuit determines that the focusing condition is assumed to be achieved in focus, the controller causes the face detection circuit to execute detection of the image corresponding to the face after causing the background detection circuit to execute detection of the image corresponding to the background.

According to the sixth aspect of the present invention, it is preferred that in the imaging device according to the second aspect of the invention, the face detection circuit includes a face candidate detection circuit that detects an image having information associated with a human skin, as a face candidate, from the image captured by the image pickup device, and a recognizing circuit that selects the face candidate having a width that is substantially equal to a width estimated based on a photographing distance of the imaging optics, from the face candidates detected by the face candidate detection circuit; and the controller causes the face candidate detection circuit to execute detection of the face candidate before the focus determination circuit determines that the focusing condition is assumed to be achieved in focus, and causes the recognizing unit to execute selection of the face after the focus determination circuit determines that the focusing condition is assumed to be achieved in focus.

According to the seventh aspect of the present invention, it is preferred that in the imaging device according to the first aspect of the invention, the focus detector detects the focusing condition of the imaging optics for a position in the image where the face of the person has been detected by the face detection circuit.

According to the eighth aspect of the invention, it is preferred that in the imaging device according to the first aspect of the invention, the focus detector detects the focusing condition of the imaging optics, based on the image corresponding to the face of the person detected by the face detection circuit.

According to the ninth aspect of the present invention, it is preferred that in the imaging device according to the eighth aspect, the focus detector includes a first focus detector that detects the focusing condition of the imaging optics based upon a pair of light fluxes from an object; and a second focus detector that detects the focusing condition of the imaging optics, based on contrast information calculated based on the image captured by the image pickup device.

According to the tenth aspect of the present invention, an imaging device comprises: an image pickup device that captures an image via an imaging optics; a focus detector that detects a focusing condition of the imaging optics; a focus determination circuit that determines whether or not the focusing condition is assumed to be achieved in focus; an image processor that executes at least one image processing routine out of a plurality of different image processing routines for extracting an image corresponding to a particular image in the image captured by the image pickup device; and a controller that selects the image processing routine to be executed by the image processor, from the plurality of image processing routines, depending on whether or not the focusing condition is assumed to be achieved in focus.

According to the eleventh aspect of the present invention, it is preferred that in the imaging device according to the tenth aspect of the invention, the image processing routines executed by the image processor include face detection image processing for detecting an image corresponding to a face of a person from the image; and when the focus determination circuit determines that the focusing condition is assumed to be achieved in focus, the controller causes the image processor to execute the face detection image processing so as to detect the image corresponding to the face of the person.

According to the twelfth aspect of the present invention, it is preferred that in the imaging device according to the eleventh aspect of the invention, the controller causes the image processor to perform an operation different from the face detection image processing, until the focus determination circuit determines that the focusing condition is assumed to be achieved in focus.

According to the thirteenth aspect of the present invention, it is preferred that in the imaging device according to the twelfth aspect of the invention, the image processing routines executed by the image processor include background detection image processing for detecting an image corresponding to a background from the image captured by the image pickup device; and the controller causes the image processor to execute the background detection image processing so as to detect the image corresponding to the background, until the focus determination circuit determines that the focusing condition is assumed to be achieved in focus.

According to the fourteenth aspect of the present invention, it is preferred that in the imaging device according to the eleventh aspect of the invention, the image processing routines executed by the image processor include background detection image processing for detecting an image corresponding to a background from the image captured by the image pickup device; and when the focus determination circuit determines that the focusing condition is assumed to be achieved in focus, the controller causes the image processor to execute the face detection image processing so as to detect the image corresponding to the face, after executing the background detection image processing so as to detect the image corresponding to the background.

According to the fifteenth aspect of the present invention, it is preferred that in the imaging device according to the eleventh aspect of the invention, the face detection image processing includes image processing for face candidate detection, for detecting an image having information associated with a human skin, as a face candidate, from the image captured by the image pickup device, and image processing for face recognition, for selecting the face candidate having a width that is substantially equal to a width estimated based on a photographing distance of the imaging optics, from the detected face candidates; and the controller causes the image processor to execute the image processing for face candidate detection so as to detect the face candidate before the focus determination circuit determines that the focusing condition is assumed to be achieved in focus, and causes the image processor to execute the image processing for face recognition so as to select the face after the focus determination circuit determines that the focusing condition is assumed to be achieved in focus.

According to the sixteenth aspect of the present invention, it is preferred that the imaging device according to the tenth aspect of the invention further comprises: a focus adjuster that adjusts the focusing condition of the imaging optics based upon data corresponding to an image extracted by the image processor.

According to the seventeenth to the twenty-second and the twenty-sixth to the thirty-first aspects of the present invention, an image detecting method is a method corresponding to the imaging device according to the first to the sixth and the tenth to the fifteenth aspects of the invention.

According to the twenty-third to the twenty-fifth and the thirty-second aspects of the invention, a focus adjusting method is a method corresponding to the imaging device according to the seventh to the ninth and the sixteenth aspects of the invention.

DESCRIPTION OF PREFERRED EMBODIMENTS

An imaging device (a single lens reflex digital still camera) according to one embodiment of the invention will be described. The imaging device of this embodiment has an automatic focus adjustment (AF) function and an image tracking function of tracking a subject as an object to be tracked, and is operable to track the object while driving a photographic lens (imaging optics) through the AF function and the image tracking function. To perform the AF function, the imaging device detects a focus adjustment state or focusing condition (a defocus amount in this embodiment) of the photographic lens at each of a plurality of focus detection areas set in a imaging plane, and drives the photographic lens for focusing, based on the defocus amount detected at a selected one of the focus detection areas. To perform the tracking function, the imaging device tracks a subject as an object to be tracked in repeatedly captured images.

Figure 1:
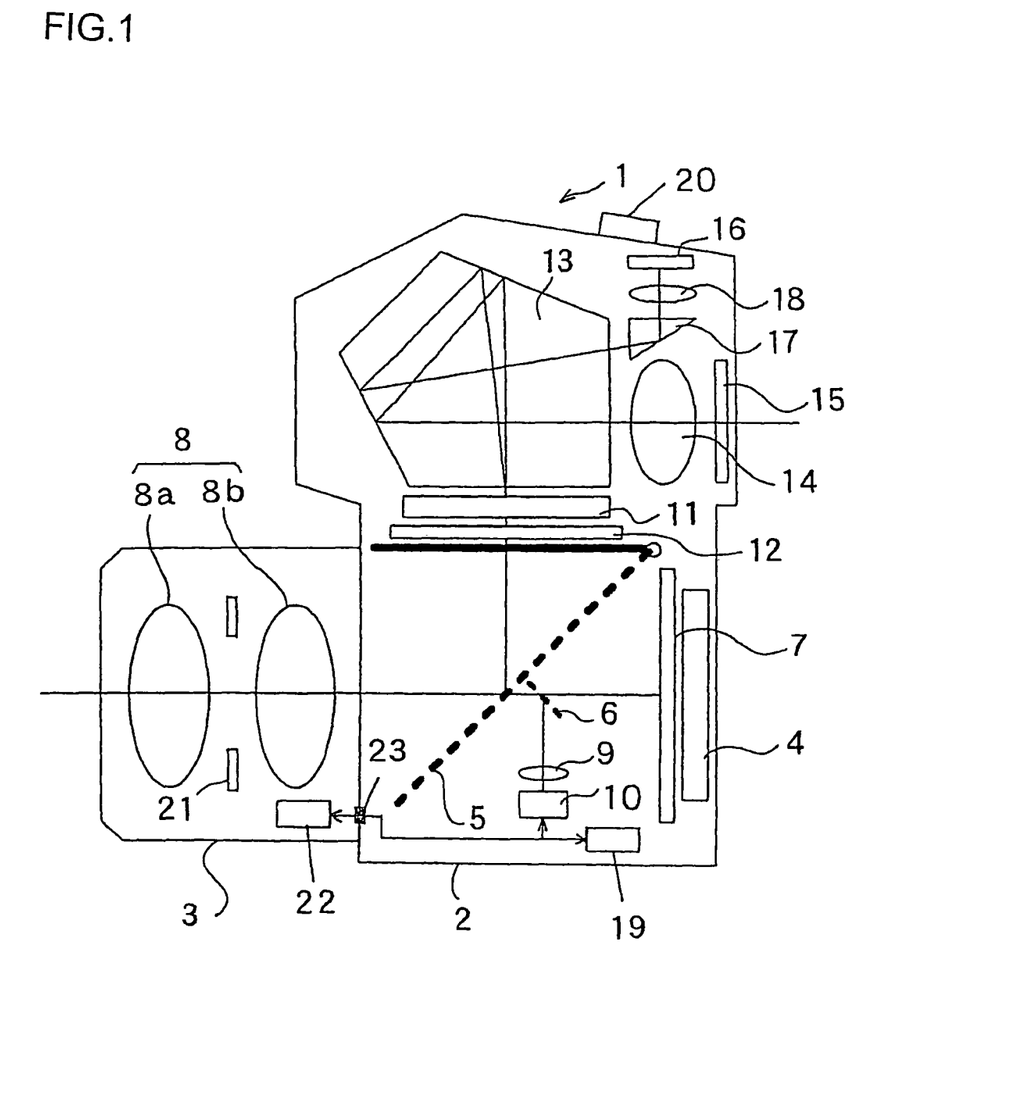
FIG. 1 is a view showing the construction of an imaging device according to one embodiment of the invention.

FIG. 1 shows the construction of an imaging device (single lens reflex digital still camera) 1 according to one embodiment of the invention. In FIG. 1, devices and circuits of the camera that are not directly related to the present invention are not illustrated, and no explanation of these devices and circuits will be provided. In the camera 1 of this embodiment, an interchangeable lens 3 is interchangeably mounted on a camera body 2. The camera body 2 includes a first image sensor 4 for capturing (picking up) an image of an object and recording the image. The first image sensor 4 may be composed of a CCD, CMOS, or the like. Upon photographing, a quick return mirror 5 and a sub-mirror 6 are retracted to a position (indicated by the solid line in FIG. 1) outside a photographic light path (i.e., an optical path of the photographic lens), and a shutter 7 is released so that an object image is formed by the photographic lens 8 on a light-receiving surface of the first image sensor 4.

At the bottom of the camera body 2, a focus detection optical system 9 and a range finding device 10 are provided for detecting the focusing condition of the photographic lens 8. In this embodiment, a split-pupil phase difference detection method is adopted as a focus detection method. The focus detection optical system 9 guides a pair of light fluxes used for focus detection, which have passed through the photographic lens 8, to the light-receiving surface of the range finding device 10 on which a pair of optical images are formed. The range finding device 10 includes, for example, a pair of CCD line sensors, and is operable to output a focus detection signal based on the pair of optical images thus formed. Prior to photographing, the quick return mirror 5 and sub-mirror 6 are set at positions as indicated by broken lines in FIG. 1, such that these mirrors 5, 6 are located within the photographic light path. In this condition, the pair of focus detection light fluxes emerging from the photographic lens 8 pass through a half mirror portion of the quick return mirror 5, and is reflected by the sub-mirror 6 to be guided to the focus detection optical system 9 and the range finding device 10.

A viewfinder optical system is provided in the upper part of the camera body 2. Prior to photographing, the quick return mirror 5 and sub-mirror 6 are located at the positions indicated by the broken lines in FIG. 1, and an object light emerging from the photographic lens 8 is reflected by the quick return mirror 5, to be guided to a viewfinder screen 11, so that an object image is formed on the viewfinder screen 11. An organic EL display device 12 is operable to superimpose information, such as focus detection area marks, on the object image formed on the viewfinder screen 11, and also display various types of photographic information, such as an exposure value, at positions outside the object image. The object image formed on the viewfinder screen 11 is guided to a viewfinder eyepiece window 15 via a roof pentaprism 13 and an eyepiece (or eye lens) 14, so that the camera user can visually check the object image.

The viewfinder optical system disposed in the upper part of the camera body 2 further includes a second image sensor 16 operable to capture (pick up) an object image for the purposes of object tracking and photometric measurements. The second image sensor 16 will be described in detail later. The object image formed on the viewfinder screen 11 is re-formed on a light-receiving surface of the second image sensor 16 via the roof pentaprism 13, a prism 17 and an image forming lens 18. The second image sensor 16 outputs image signals indicative of or corresponding to the object image. The object image formed on the viewfinder screen 11 prior to photographing is guided to the second image sensor 16 via the roof pentaprism 13, prism 17 and image forming lens 18, and the object image is re-formed on the light-receiving surface of the second image sensor 16. Tracking control and exposure computation are performed based on the object image captured by the second image sensor 16, as will be described in detail later.

The camera body 2 is also provided with a body drive control device 19, operating members 20, and so forth. The body drive control device 19 consists of a microcomputer and a memory (which will be described in detail later), and peripheral components, such as an A/D converter, and performs various controls and computations associated with the camera 1. The operating members 20 include switches and selectors, such as a shutter button, a focus detection area selection switch and a photographing mode selection switch, for operating the camera 1.

The interchangeable lens 3 includes a zooming lens 8a, a focusing lens 8b, a diaphragm 21, a lens drive control device 22, and so forth. While the photographic lens 8 is typically represented by the zooming lens 8a, focusing lens 8b and the diaphragm 21 in this embodiment, the structure of the photographic lens 8 is not limited to that shown in FIG. 1. The lens drive control device 22 consists of a microcomputer, a memory, a drive circuit, and peripheral components, such as an actuator, which are not illustrated, and is operable to control driving of the lenses 8a, 8b and diaphragm 21 and detect the positions of these components. Information, such as the focal length and full-aperture (f-number) of the interchangeable lens 3, is stored in the memory incorporated in the lens drive control device 22.

The body drive control device 19 and the lens drive control device 22 communicate with each other via a contact 23 at which the interchangeable lens 3 is mounted on the camera body 2. More specifically, some pieces of information, including the lens drive amount (i.e., the amount by which the lens is to be driven) and the aperture value, are transmitted from the body drive control device 19 to the lens drive control device 22, and some pieces of information, including lens information and aperture information, are transmitted from the lens drive control device 22 to the body drive control device 19.

Figure 2:
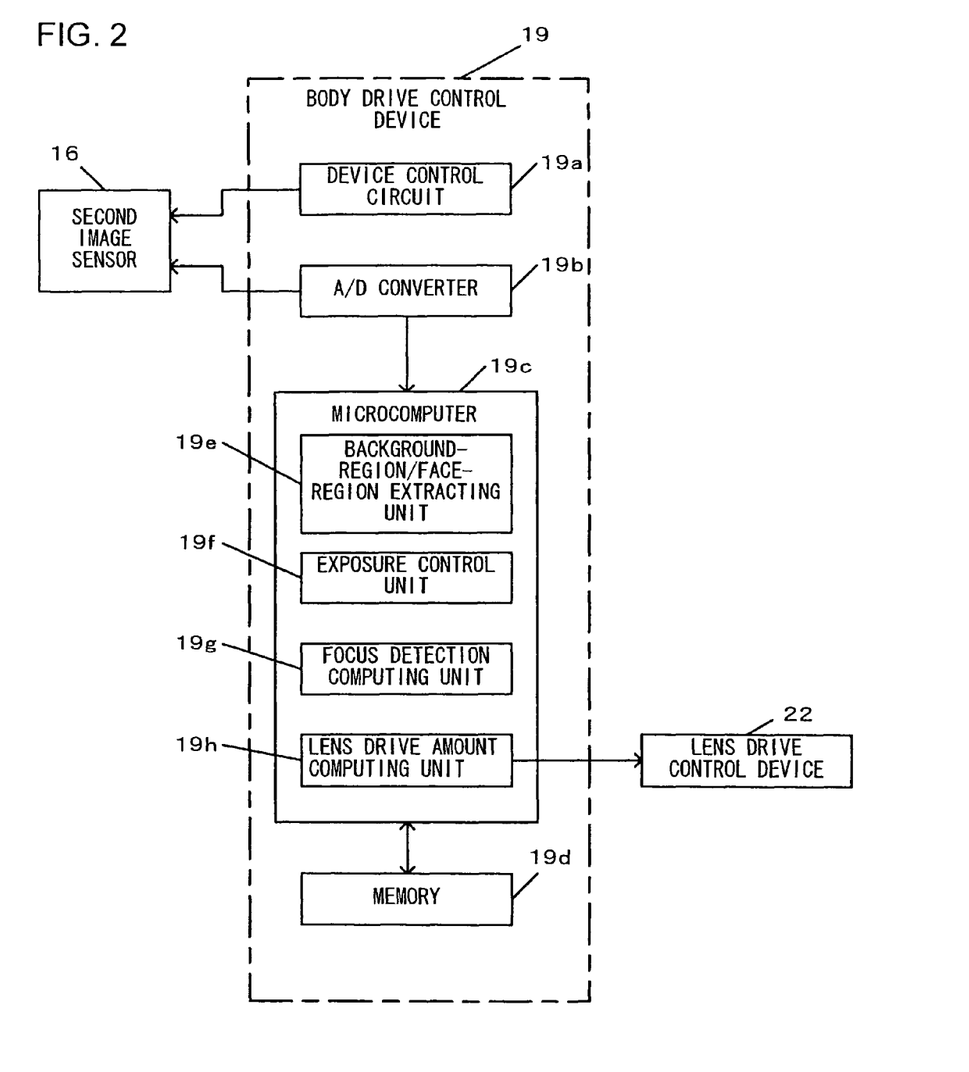
FIG. 2 is a view showing the detailed construction of a body drive control device of the embodiment of FIG. 1.

FIG. 2 illustrates the detailed construction of the body drive control device 19. Here, control functions that are not directly related to the present invention are not illustrated nor explained. The body drive control device 19 includes a device control circuit 19a, an A/D converter 19b, a microcomputer 19c, a memory 19d, and so forth. The device control circuit 19a controls the accumulation of electric charge and readout of the second image sensor 16. The A/D converter 19b converts analog image signals generated from the second image sensor 16 to digital image signals. The microcomputer 19c provides a background-region/face-region extracting unit 19e, an exposure control unit 19f, a focus detection computing unit 19g and a lens drive amount computing unit 19h in software forms. The memory 19d stores information, such as a template image for use in image tracking, defocus amount, and lens information, such as the focal length, full-aperture, aperture value, and a conversion factor by which the image shift amount is converted to the defocus amount.

The background-region/face-region extracting unit 19e extracts a background region or a face region from an object image captured by the second image sensor 16. The manners of extracting the background region and the face region will be described in detail later. The exposure computing unit 19f computes an exposure value (shutter speed and aperture value), based on the image signals indicative of the image captured by the second image sensor 16.

The focus detection computing unit 19g detects the focusing condition, or defocus amount in this embodiment, of the photographic lens 8, based on a focus detection signal derived from a pair of optical images and received from the range finding device 10. As will be described in detail later, a plurality of focus detection areas are set in a picture frame of the photographic lens 8, and the range finding device 10 outputs a focus detection signal corresponding to a pair of optical images for each of the focus detection areas. The focus detection computing unit 19g detects or determines a defocus amount based on the focus detection signal corresponding to the pair of optical images for each focus detection area. The lens drive amount computing unit 19h converts the detected defocus amount to a lens drive amount (i.e., the amount by which the lens is to be driven for focusing).

Figure 3A:
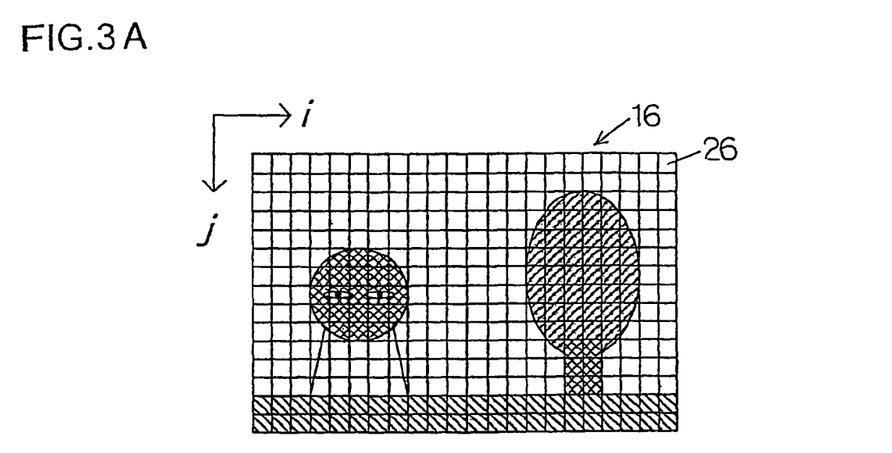
FIGS. 3A and 3B are views illustrating an example of an image of a subject captured by a second image sensor.

FIG. 3A illustrates an example of an image of an object captured by the second image sensor 16. The second image sensor 16 includes a plurality of pixels 26 (photoelectric conversion devices: 22 (across)×15 (down)=330 (pixels) in this example) arranged in the form of a matrix. In this embodiment, the coordinate of each pixel 26 of the second image sensor 16 as viewed in the lateral direction is represented by i (=1-22), and the coordinate of each pixel 26 as viewed in the vertical direction is represented by j (=1-15), while the coordinates of the pixel 26 located at the left, upper corner are (1, 1), which is the origin point of the coordinate system.

Figure 3B:
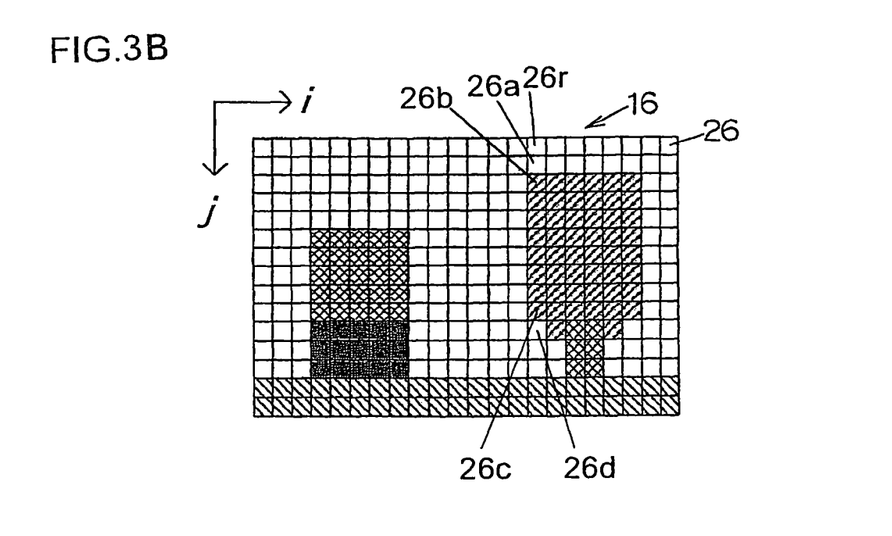
Figure 4:
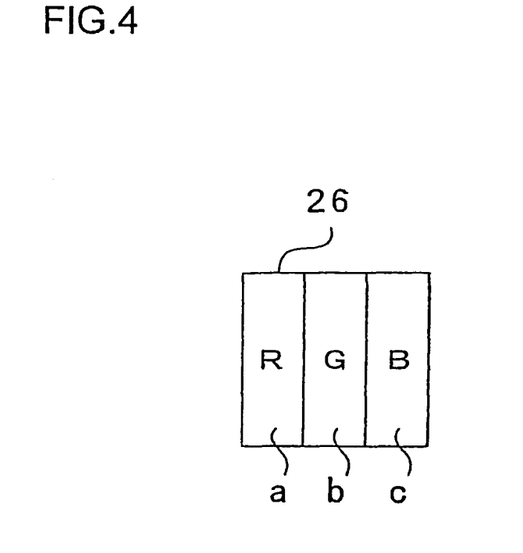
FIG. 4 is a view showing the detailed structure of each pixel of the second image sensor.

Each pixel 26 is divided into three sections 26a, 26b, 26c, as shown in FIG. 4, and these sections 26a, 26b, 26c are provided with red (R), green (G) and blue (B) primary-color filters, respectively. With this arrangement, the second image sensor 16 can output an RGB signal of an object image for each pixel 26. When the second image sensor 16 captures the object image as shown in FIG. 3A, an image signal as shown in FIG. 3B is generated from each pixel 26 of the second image sensor 16.

In the basic operating mode of this embodiment, a face region is extracted from the captured image, and a portion of the image corresponding to a face of a person is brought into focus, while exposure control is performed so as to achieve appropriate brightness of the face portion. If, however, the focusing condition of the photographic lens 8 is such that the face portion is out of focus, the size of the face cannot be correctly estimated, and the face region cannot be accurately extracted from the captured image.

In this embodiment, therefore, when the face portion of the image captured by photographic lens 8 is out of focus, the operation to extract a face region from the image is not carried out, but the operation to extract a background region from the image is carried out instead. Then, a portion of the image other than the extracted background region is determined as a region of a main object, and the main object portion is brought into focus, while exposure control is performed so as to achieve appropriate brightness of the main object portion.

Here, a method of extracting the background region and a method of extracting the face region, which are implemented by the body drive control device 19, will be explained. Initially, in order to extract the background region, the hue Hue[i, j] is calculated with respect to image signals of all of the pixels 26 of the second image sensor 16, and the background region is determined or discriminated from other regions, using the following conditional expression (1) and conditional expression (2). Namely, a region of the pixels that satisfies both of the conditional expressions (1) and (2) is regarded as the background region. The computation for extracting the background region according to the conditional expressions (1), (2) is executed from the upper part to the lower part of the image as shown in FIGS. 3A and 3B, i.e., in increasing order of the value "j", for each column, with reference to the uppermost row of the image as represented by j=1.

$$\text{ABS}(\text{Hue}[i,j]-\text{Hue}[i,1]) < Th\text{Hue} \quad (1)$$

$$M1[i,j-1] \neq 0 \quad (2)$$

In the conditional expression (1), ABS( ) is a function that gives an absolute value of a difference of the hues entered, and ThHue is a threshold value that is determined through experiments, or the like. When the conditional expression (1) is satisfied for a certain pixel, the hue of the pixel in question is consider to be similar to the hue of the reference pixel (located in the uppermost row of the image). The conditional expression (2) indicates whether a pixel (i, j−1) that is located immediately above the pixel (i, j) in question belongs to the background region, and the value of M1[i, j−1] is set to 1 when the pixel (i, j−1) belongs to the background region, and set to 0 when the pixel (i, j−1) does not belong to the background region. When j≠1 is satisfied, namely, the pixel is not located in the uppermost row, the initial value of M1[i, j] is 0. When the pixel in question is in the uppermost row, the initial value M1[i, 1] is 1.

Since there is a high possibility that a region that covers pixels represented by coordinates [i, 1] and located in the uppermost row of the image belongs to the background, the hue of this region is regarded as a reference hue of the background, and the hues of other regions adjacent to the background region are sequentially compared with the reference hue of the background region. In FIG. 3B, for example, the hue of a reference pixel 26r (j=1) is similar to the hue of a pixel 26a (j=2), and the conditional expressions (1) is satisfied. Furthermore, the value of M1[i, 1] for the pixel 26r is 1, and the conditional expression (2) is satisfied. As a result, the pixel 26a is extracted as a part of the background region, and the value of M1[i, 2] is set to 1. Namely, if a difference between the reference hue of the background region and the hue of another region adjacent to the background region is smaller than the threshold value ThHue, the region adjacent to the background region is determined as part of the background region, and M1[i, j] of the coordinates of this region is set to 1.

Subsequently, a pixel 26b (j=3) is compared with the pixel 26r. The hue of the pixel 26b is not similar to the hue of pixel 26r; therefore, the conditional expression (1) is not satisfied, and the pixel 26b is not extracted as part of the background region. Since the pixel 26b is determined as not belonging to the background region, the value of M1[i, 3] is set to 0 irrespective of the value of M1[i, 2]. In a similar manner, pixels 26c (j=n) are not determined as being in the background region, and the values of M1[i, n] are set to 0.

When a pixel 26d (j=n+1) is compared with the pixel 26r, if the hue of the pixel 26d is similar to the hue of the reference pixel 26r, the conditional expression (1) is satisfied. However, the value of M1[i, n] for the pixel 26c is set to 0, and the conditional expression (2) is not satisfied. Accordingly, the pixel 26d is not extracted as part of the background region, and the value of M1[i, n+1] is set to 0. Thus, a region having a hue similar to that of the reference pixel and having continuity with the reference pixel in the row direction is extracted as a background region.

Figure 5A:
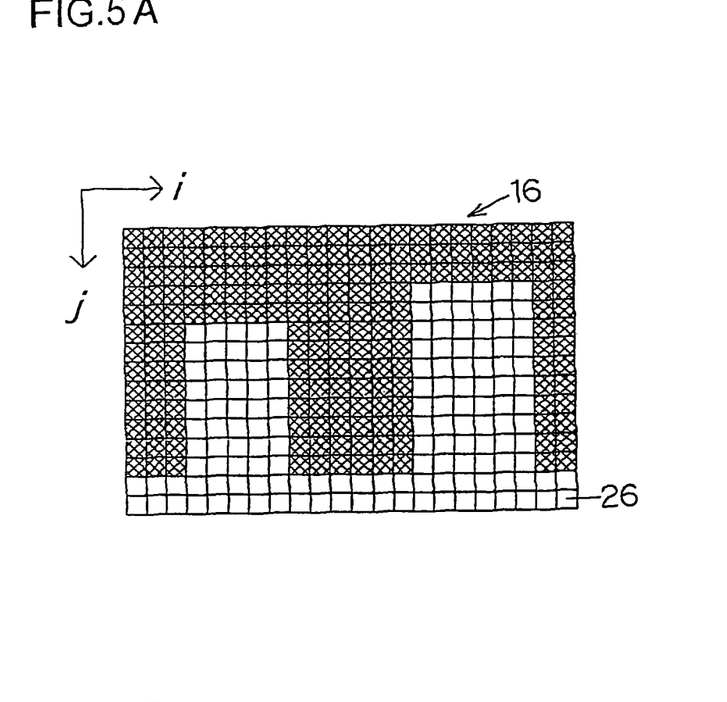
FIG. 5A is a view showing the result of extraction of a background region according to the above-indicated one embodiment of the invention.

When an object as shown in FIG. 3A is captured by the second image sensor 16, image signals as shown in FIG. 3B are generated from the respective pixels 26 of the second image sensor 16. In this case, if the above-described operation to extract the background region is performed based on these image signals, the result of extraction of the background region as shown in FIG. 5A is obtained. In FIG. 5A, a region of the pixels 26 depicted as hatched areas represents the extracted background region.

Next, the method of extracting the face region will be explained. The hue Hue[i, j] is calculated with respect to the image signals of all of the pixels 26 of the second image sensor 16, and the pixels 26 that satisfy the following conditional expression (3) are extracted as candidates for face region.

$$\text{HueLoConst} < \text{Hue}[i,j] < \text{HueHiConst} \quad (3)$$

In the conditional expression (3), HueLoConst and HueHiConst represent the lower limit and upper limit of the hue of human skin, respectively, and are equal to, for example, 0° and 30°, respectively.

Figure 6A:
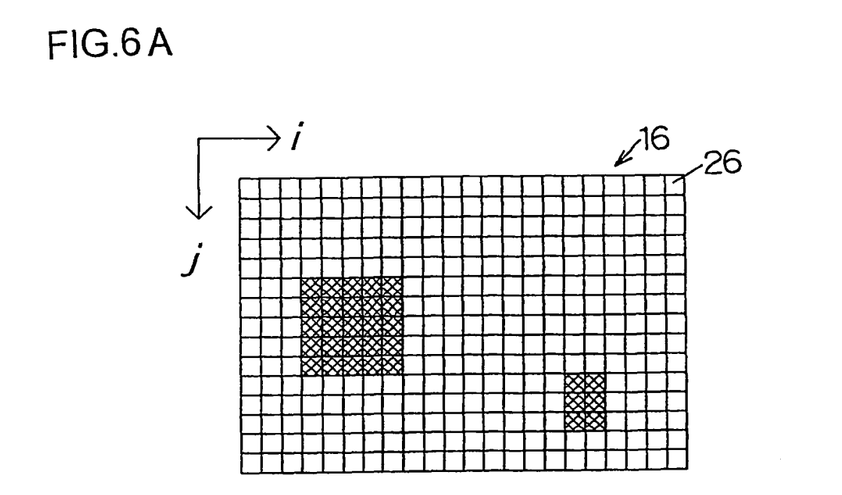
FIG. 6A is a view showing the result of extraction of face candidate regions according to the above-indicated one embodiment.

When the object as shown in FIG. 3A is captured by the second image sensor 16, the image signals as shown in FIG. 3B are generated from the respective pixels 26 of the second image sensor 16. In this case, if the above-described operation to extract face candidate regions is performed based on these image signals, face candidate regions as indicated in FIG. 6A are extracted as a result of the extracting operation. In FIG. 6A, regions of the pixels 26 depicted as hatched areas represent extracted candidates for face region.

Also, the number of pixels FaceWidth (the estimated number of face pixels) of the second image sensor 16, which corresponds to the width of a typical human face, is calculated according to the following equation (4).

$$\text{FaceWidth} = FwTyp \cdot f / (\text{Distance} \cdot \text{Sensor Pitch}) \quad (4)$$

In the above equation (4), FwTyp is a constant (for example, 160 mm) used for setting the length that is estimated as the width of a typical human face, f is the focal length, Distance is the photographing distance of the photographic lens 8 obtained from the lens drive control device 22, and Sensor-Pitch is the pitch of the pixels 26 of the second image sensor 16.

Figure 6B:
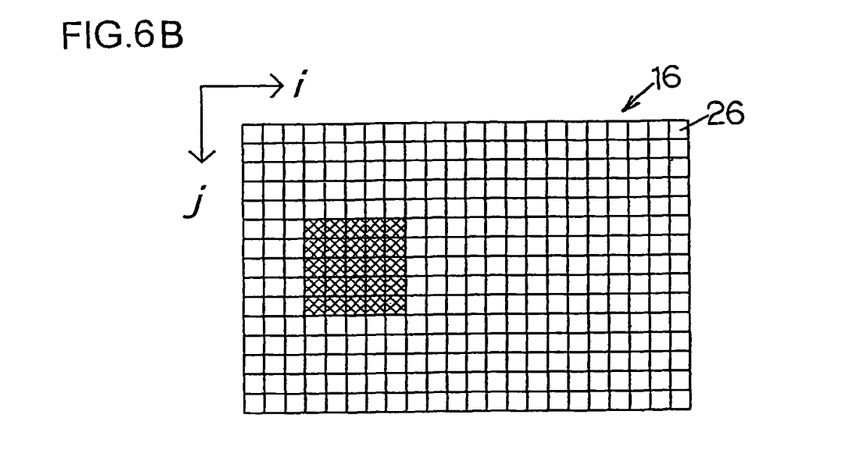
FIG. 6B is a view showing the result of extraction of a face region according to the same embodiment.

The estimated number of face pixels FaceWidth (in units of pixels) calculated according to the above-indicated equation (4) is compared with the number of pixels (in units of pixels), as counted in the lateral direction, of each face candidate region extracted according to the conditional expression (3), and the face candidate region is determined as a face region if these numbers of the pixels are equal to each other. For example, the estimated number of face pixels FaceWidth calculated according to the equation (4) is supposed to be five pixels. The right-handed region of the two face candidate regions indicated in FIG. 6A has a region of 2×3 pixels and the number of pixels as counted in the lateral direction of this region is not equal to the estimated number of face pixels FaceWidth (=five pixels). Accordingly, the right-handed region of 2×3 pixels is determined as not representing a face, though the hue of this region is similar to that of human skin. On the other hand, the left-hand region of the two face candidate regions in FIG. 6A has a region of 5×5 pixels and the number of pixels as counted in the lateral direction of the region is equal to the estimated number of face pixels FaceWidth (=five pixels). Namely, since the lateral dimension or width of this face candidate region is equal to the estimated face width, the left-hand region of 5×5 pixels in FIG. 6A is selected and determined as a face region. In FIG. 6B, a region depicted as a hatched area represents the face region extracted as the result of the above extracting operation.

Figure 7:
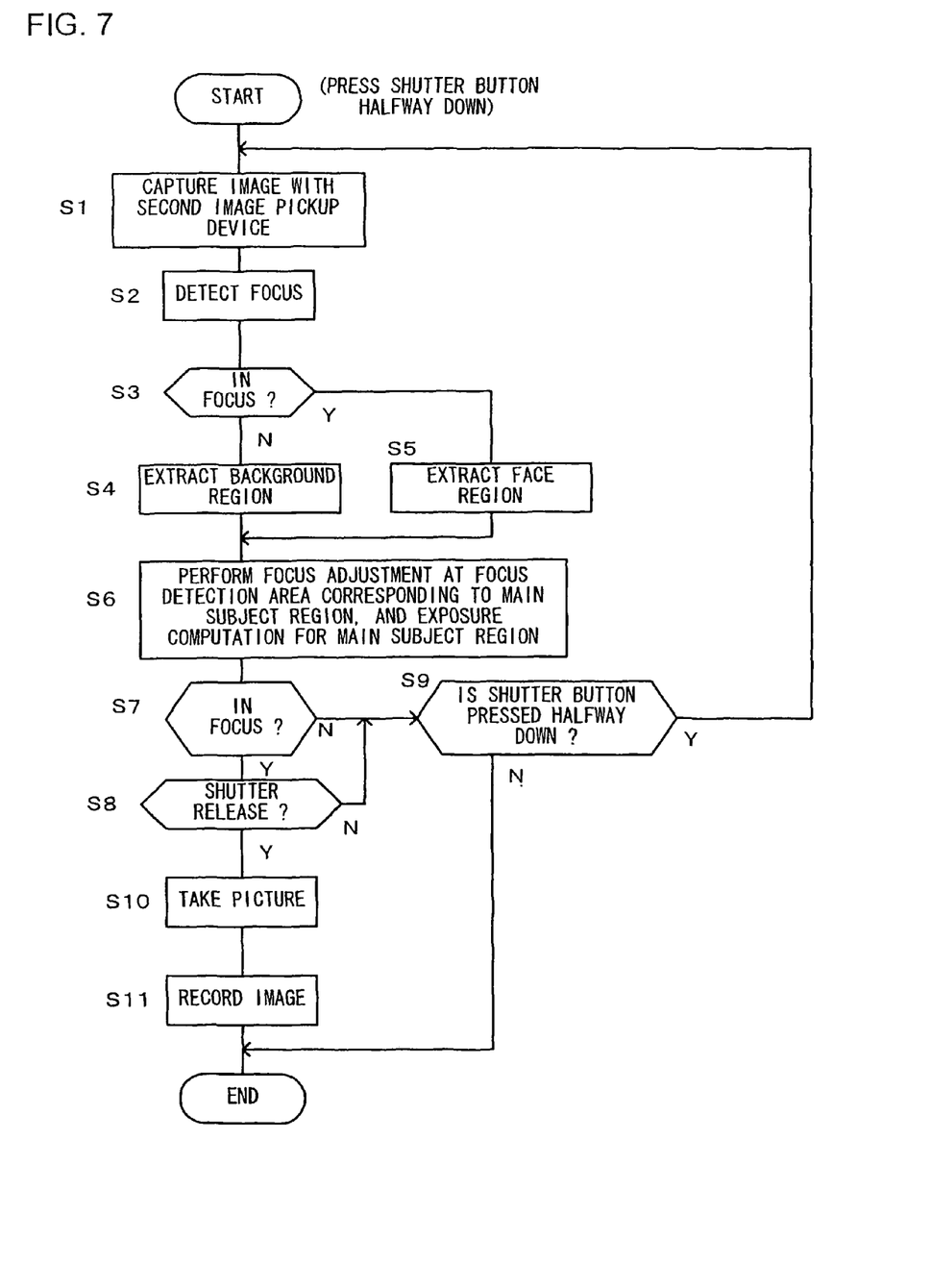
FIG. 7 is a flowchart illustrating a photographing operation performed by the imaging device of the embodiment of FIG. 1.

FIG. 7 is a flowchart illustrating a photographing operation performed by the imaging device according to the above-described one embodiment of the invention. The operation of this embodiment will be explained with reference to FIG. 7. The body drive control device 19 starts the photographing operation when a release half-depression switch of the operation members 20 detects that the shutter button is pressed halfway down. In step 1, an image is captured by the second image sensor 16, and image signals of the respective pixels 26 are stored in the memory 19d. In the following step 2, the defocus amount in a focusing condition of the photographic lens 8 is detected based on a focus detection signal generated from the range finding device 10.

Figure 5B:
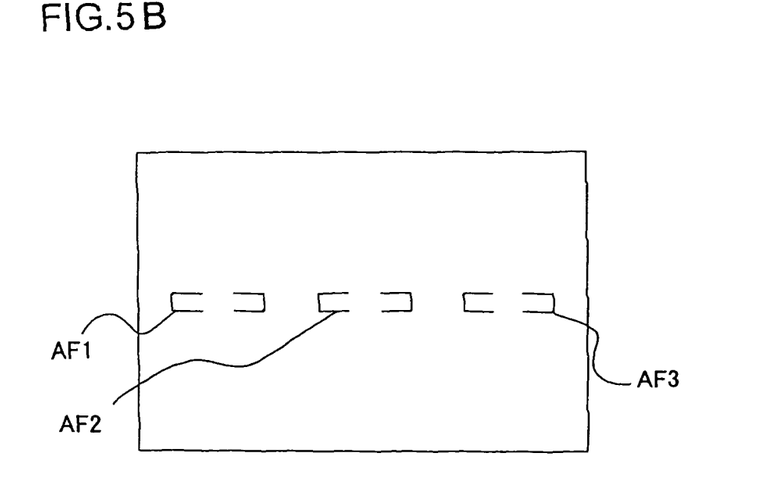
FIG. 5B is a view showing an example of the arrangement of focus detection areas.

In step 3, it is determined whether the defocus amount as a result of focus detection is within a focus determination threshold value, and whether the photographic lens 8 is in focus for a desired subject. In this connection, if three focus detection areas AF1-AF3 are provided in the lateral direction, as shown in FIG. 5B by way of example, the determination as to whether the focusing condition of the photographic lens 8 is in focus is made based on the focus detection result on the focus detection area corresponding to the closest object from the imaging device 1, among the focus detection areas AF1-AF3. As the focus determination threshold value, a defocus amount of, for example, 350 to 500 (µm) is employed. If the focusing condition of the photographic lens 8 is not in focus for the subject in the selected focus detection area, the control proceeds to step 4 to execute the above-described operation to extract a background region from the captured image. If the focusing condition of the photographic lens 8 is in focus for the object, the control proceeds to step 5 to execute the above-described operation to extract a face region from the captured image. In the case where extraction of the background region is effected (i.e., if step 4 is executed), it is assumed that a main object is present in a region other than the background, and the region other than the background is designated as a main object region. In the case where extraction of the face region is effected (i.e., if step 5 is executed), on the other hand, the face region is designated as a main object region.

In step 6, the focusing condition of the photographic lens 8 is adjusted with respect to the focus detection area corresponding to the main object region, and exposure computation is performed on the main object region. In the case where extraction of the background region was effected, the focusing condition of the photographic lens 8 is adjusted based on the focus detection result on the focus detection area corresponding to the main object region other than the background region. If there are two or more focus detection areas corresponding to the main object region, the focus adjustment is performed, for example, based on the focus detection result on the focus detection area corresponding to the closest object from the imaging device 1, among the two or more focus detection areas. For example, when the background region as shown in FIG. 5A is extracted, the focus adjustment is performed based on the focus detection result on the focus detection area corresponding to the closest object from the imaging device 1, among the focus detection results on the focus detection areas AF1 and AF3 (FIG. 5B) corresponding to the main subject region other than the background region.

In the case where extraction of the face region was effected, the focusing condition of the photographic lens 8 is adjusted based on the focus detection result on the focus detection area corresponding to the main object region, or face region. For example, when the face region is extracted as shown in FIG. 6B, the focus adjustment is performed based on the focus detection result on the focus detection area AF1 (FIG. 5B) provided in or in the vicinity of the face region. If any face region cannot be extracted in step 5, the focus adjustment is performed in step 6, based on the focus detection result on the focus detection area corresponding to the closest object from the imaging device 1, among the focus detection results on the focus detection areas AF1-AF3.

In the case where extraction of the background region was effected, exposure computation is performed and the shutter speed and the aperture value are calculated, based on the image signals of the pixels 26 corresponding to the main object region other than the background region, which are selected from the image signals of the respective pixels 26 of the second image sensor 16. In the case where extraction of the face region was effected, on the other hand, exposure computation is performed and the shutter speed and the aperture value are calculated, based on the image signals of the pixels 26 corresponding to the main object region, or face region, which are selected from the image signals of the respective pixels 26 of the second image sensor 16. The result of the exposure computation is recorded in a certain storage region (not shown) in the body drive control device 19, and is read out when a photographing operation (step 10) as described later is performed.

In step 7, it is determined whether the defocus amount detected at the focus detection area corresponding to the main object region, or the focus detection area corresponding to the closest object from the imaging device 1 when no face region is detected, is within the focus determination threshold value, i.e., whether the focusing condition of the photographic lens 8 is in focus for the focus detection area. As the focus determination threshold value used in step 7, a defocus amount of, for example, 20 to 40 (μm) is employed. If the focusing condition of the photographic lens 8 is not in focus, step 9 is executed to determine whether the shutter button remains pressed halfway down. If the shutter button remains pressed halfway down, the control returns to step 1, and the above-described operation is repeated. If the shutter button is released, on the other hand, the photographing operation ends.

If it is determined in step 7 that the focusing condition of the photographic lens 8 is in focus for the object in the main object region, the control proceeds to step 8 to detect a shutter release operation, namely, determine whether a release switch of the operation members 20 has been operated to release the shutter. If no shutter release operation is detected, the control proceeds to step 9, and the above-described operation is performed depending upon whether the shutter button remains pressed halfway down. If a shutter release operation is detected, on the other hand, the control proceeds to step 10 to perform a photographing operation. More specifically, the aperture 21 is set to the aperture value as a result of the exposure computation, and the shutter 7 is released for a length of time (in seconds) obtained as a result of the exposure computation, for exposure of the first image sensor 4 to light, so that the image is captured by the first image sensor 4.

In step 11 following the capture of the image, the image signals generated from the first image sensor 4 are subjected to known image processing, and are recorded on a storage medium (not shown), such as a memory card, while being displayed on a monitor (not shown).

Thus, according to the illustrated embodiment, a human face region, i.e., an image corresponding to a human face, is detected from the captured image after it is determined from the focus detection result that the focusing condition of the photographic lens 8 is in focus for the object; therefore, the human face region can be correctly detected from within the captured image.

In the illustrated embodiment, the face candidate region detecting operation is performed to detect human skin colored regions from the captured image and designate these regions as face candidate regions, while the face width estimating operation is performed to estimate the width of a typical human face based on the photographing distance, and one or more face candidate regions whose width (lateral dimension) coincides with the estimated face width is/are designated as a face region or regions. In the face region detecting operation, the face candidate region detecting operation may be executed before the focusing condition indicates to be achieved in focus, and the face width estimating operation may be executed after the focusing condition indicates to be achieved in focus. Normally, it is desirable to expose the first image sensor 4 to light for photographing immediately after the focusing condition of the photographic lens 8 is brought into focus. If the face candidate region detecting operation is executed before the focusing condition indicates to be achieved in focus, photographing can be carried out (i.e., an exposure can be made) immediately after focusing, and a correctly focused photograph can be taken by the camera.

In the illustrated embodiment, the operation to detect the background region, namely, to detect an image corresponding to the background, is performed until the focusing condition indicates to be achieved in focus, and the operation to detect the face region is performed only after the focusing condition indicates to be achieved in focus. However, operations to be carried out before the focusing condition is achieved in focus are not limited to the operation to detect the background region, but may include an image identifying operation or operations different from the face region detecting operation in order to extract a particular image, for example, an operation to determine the scene of photographing based on the captured image.

In step 3 as described above, the determination as to whether the focusing condition of the photographic lens 8 is in focus may not be made based on the focus detection result on the focus detection area corresponding to the closest object from the imaging device 1, among the focus detection results of the two or more focus detection areas. For example, the defocus amount of the focus detection area that is not corresponding to the closest object may be used, based on the distribution of the defocus amounts detected with respect to the two or more focus detection areas.

Variant Embodiment of the Illustrated Embodiment

In the embodiment as described above, the face region extracting operation is performed immediately after it is found that the focusing condition of the photographic lens 8 is in focus for the object. Generally, the face region extracting operation requires a longer period of computation time than that of the background region extracting operation. Also, if the face region extracting operation is performed to extract a face region from the entire range of the captured image, a region included in the background and having a hue similar to the hue of human skin might be selected by mistake as a face region.

Figure 8:
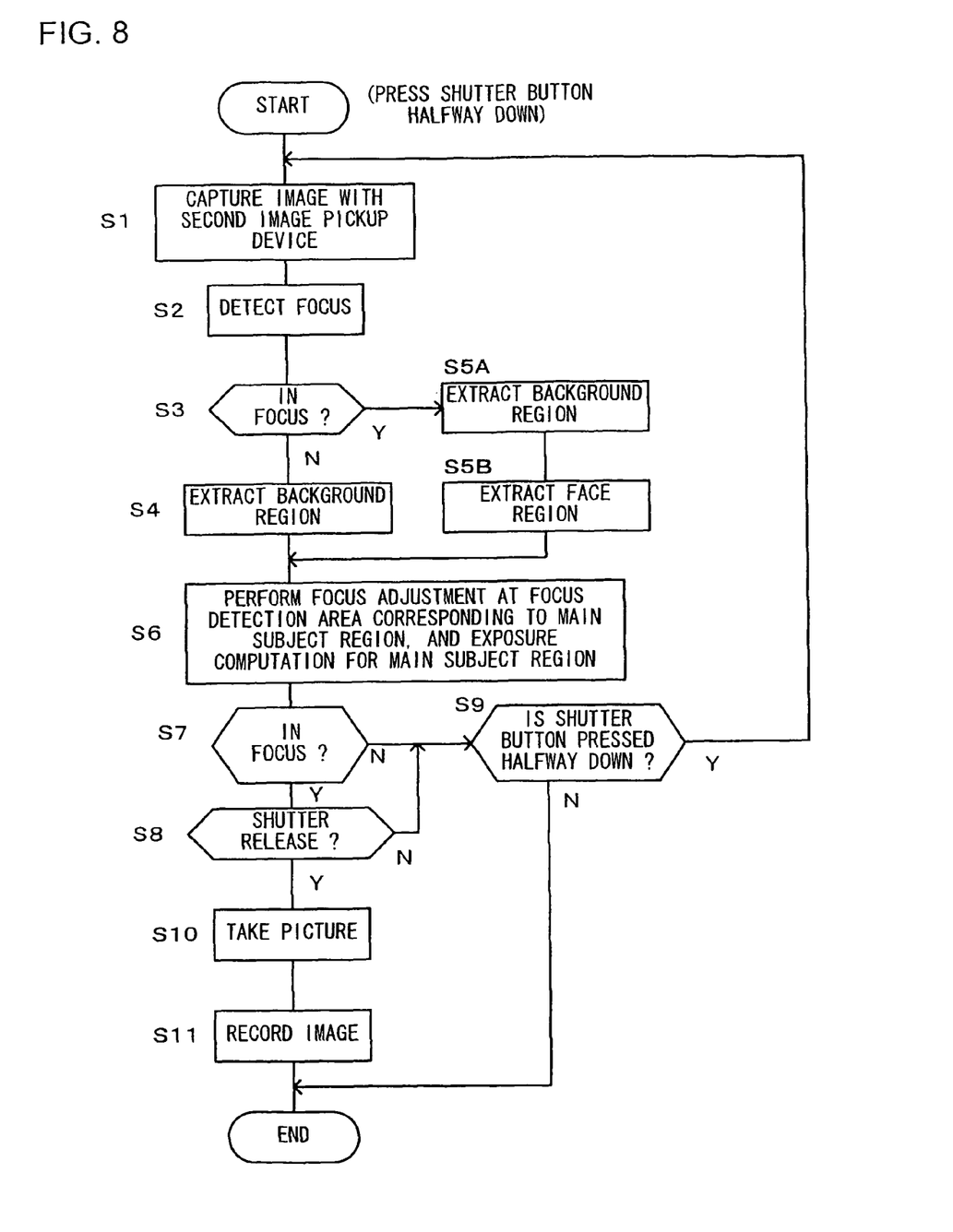
FIG. 8 is a flowchart illustrating a photographing operation of a variant embodiment.

Thus, in one variant example of the embodiment as shown in FIG. 8, even when it is determined in step 3 that the focusing condition of the photographic lens 8 is in focus for the object, the background region extracting operation is once performed in step 5A, and the face region extracting operation is subsequently performed in step 5B. In the face region extracting operation of step 5B, a background region extracted in the background region extracting operation is excluded from the image captured by the second image sensor 16, to provide a main object region, and the face region extracting operation is performed only with respect to the main object region.

In the manner as described above, the computation time required for finally extracting the face region can be reduced. In addition, since the face region extracting operation is performed only with respect to the main object region, a region included in the background and having a hue similar to that of human skin is prevented from being recognized by mistake as a face region, thus assuring improved accuracy with which the face region is extracted.

While the focusing condition of the photographic lens 8 is detected by a phase difference detection method using the focus detection optical system 9 and the range finding device 10 in the illustrated embodiment, the method of detecting the focusing condition of the photographic lens 8 is not limited to that of the illustrated embodiment. For example, focus detection of a contrast detection type may be performed based on an image captured by the first image sensor 4 or second image sensor 16.

The present invention may be applied to an imaging device that performs focus detection of a so-called hybrid type, using both focus detection according to the above-described phase difference detection method and focus detection according to the contrast detection method. In this case, the operation of step 3 in FIG. 7 or FIG. 8 may be performed according to the phase difference detection method, and the operation of step 7 may be performed according to the contrast detection method. In this case, too, focus detection of the contrast detection type may be performed based on an image captured by the first image sensor 4 or second image sensor 16.

While the face region and background region are detected based on the image captured by the second image sensor 16 in the illustrated embodiment, the face and background regions may be detected based on an image captured by the first image sensor 4.

The present invention may be applied to an imaging device in which pixels used for focus detection are disposed on the first image sensor 4 at positions corresponding to the focus detection areas as shown in FIG. 5B.

When the camera 1 is equipped with an attitude sensor, the background region extracting operation may be switched between two modes, depending on whether the user holds the camera 1 in a horizontal position or in a vertical position. In this case, if it is determined based on an output signal from the attitude sensor that the camera 1 is in the horizontal position, the body drive control device 19 extracts a background region by checking each column of the pixels 26 for similarity in hue, as described above. If it is determined based on an output signal from the attitude sensor that the camera 1 is in the vertical position, the body drive control device 19 may extract a background region by checking each row of the pixels 26, or the pixels 26 arranged in the "i" direction, for similarity in hue.

Furthermore, the methods of detecting or extracting the face region and the background region from the image are not limited to those of the illustrated embodiment.

While the present invention is applied to a single lens reflex digital still camera in the illustrated embodiment and its variant embodiment, the invention may also be applied to other types of cameras, such as a compact camera and a video camera. In this case, if the camera includes a fixed focus lens, the focal length f in the above-indicated equation (4) becomes a constant. Also, this invention may be applied to a camera having no tracking function, though the camera of the illustrated embodiment has a tracking function.

The above described embodiments are examples, and various modifications can be made without departing from the scope of the invention.

What is claimed is:

1. An image processing device, comprising:
an image pickup device that captures an image via imaging optics;
an image processor configured to perform image processing of the image captured by the image pickup device.
a focus detector that detects a focusing condition of the imaging optics; and
a focus determination unit that determines whether the focusing condition is assumed to be achieved in focus, wherein
the image processor begins background detection when the focus determination unit does not determine that the focusing condition is assumed to be achieved in focus, and
the image processor begins face detection when the focus determination unit determines that the focusing condition is assumed to be achieved in focus.

2. An image processing device, comprising:
an image pickup device that captures an image via imaging optics;
an image processor configured to perform image processing of the image captured by the image pickup device;
a focus detector configured to detect a focusing condition of the imaging optics; and
a focus determination unit that determines whether the focusing condition is assumed to be achieved in focus, wherein
the image processor begins face detection when the focus determination unit determines that the focusing condition is assumed to be achieved in focus, and
the image processor begins an image identifying process when the focus determination unit does not determine that the focusing condition is assumed to be achieved in focus, the image identifying process being different from the face detection.

3. An image processing device, comprising:
an image pickup device configured to capture an image via imaging optics;
an image processor configured to perform image processing of the image captured by the image pickup device;
a focus detector that detects a focusing condition of the imaging optics; and
a focus determination unit that determines whether the focusing condition is assumed to be achieved in focus, wherein
the image processor begins a first image analyzing process to detect a face when the focus determination unit determines that the focusing condition is assumed to be achieved in focus, and
the image processor begins a second analyzing process other than face detection when the focus determination unit does not determine that the focusing condition is assumed to be achieved in focus.

4. The imaging image processing device according to claim 3, wherein
the second analyzing process is scene determination.

5. An image processing device, comprising:
an image pickup device configured to capture an image via imaging optics;
an image processor configured to perform image processing of the image captured by the image pickup device;
a focus detector that detects a focusing condition of the imaging optics; and
a focus determination unit that determines whether the focusing condition is assumed to be achieved in focus, wherein
when the focus determination unit determines that the focusing condition is assumed to be achieved in focus, the image processor begins a face detection after beginning background detection.

6. An image processing device, comprising:
an image pickup device configured to capture an image via imaging optics;
an image processor configured to perform image processing of the image captured by the image pickup device;
a focus detector configured to detect a focusing condition of the imaging optics;
a focus determination unit that determines whether the focusing condition is assumed to be achieved in focus, wherein
when the focus determination unit determines that the focusing condition is assumed to be achieved in focus, the image processor begins a face detection after performing an image identifying process, the image identifying process being different from the face detection.

7. An image processing device, comprising:
an image pickup device configured to capture an image via imaging optics;
an image processor configured to perform image processing of the image captured by the image pickup device;
a focus detector configured to detect a focusing condition of the imaging optics;
a focus determination unit that determines whether the focusing condition is assumed to be achieved in focus, wherein
when the focus determination unit determines that the focusing condition is assumed to be achieved in focus, the image processor begins a second analyzing process other than face detection before beginning a first image analyzing process to detect a face.

8. The image processing device according to claim 7, wherein
the second analyzing process is scene determination.

9. An imaging device, comprising:
an image pickup device that captures an image via imaging optics;
a focus detector that detects a focusing condition of the imaging optics;
a focus determination unit that determines whether the focusing condition is assumed to be achieved in focus;
a face detection unit that detects a face image corresponding to a face of a person from the image captured by the image pickup device;
a background detection unit that detects a background image corresponding to a background from the image captured by the image pickup device; and
a controller that causes the face detection unit to detect the face image in accordance with results of the determination of the focus determination unit, wherein
when the focus determination unit determines that the focusing condition is assumed to be achieved in focus, the controller causes the face detection unit to detect the face image after causing the background detection unit to detect the background image.

10. An imaging device, comprising:
an image pickup device that captures an image via imaging optics;
a focus detector that detects a focusing condition of the imaging optics;
a focus determination unit that determines whether the focusing condition is assumed to be achieved in focus;
a face detection unit that detects a face image corresponding to a face of a person from the image captured by the image pickup device;
a background detection unit that detects a background image corresponding to a background from the image captured by the image pickup device; and
a controller that causes the face detection unit to detect the face image in accordance with results of the determination of the focus determination unit, wherein
the controller causes the background detection unit to detect the background image until the focus determination unit determines that the focusing condition is assumed to be achieved in focus, and
the controller causes the face detection unit to detect the face image when the focus determination unit determines that the focusing condition is assumed to be achieved in focus.

11. An imaging device, comprising:
an image pickup device that captures an image via imaging optics;
a focus detector that detects a focusing condition of the imaging optics;
a focus determination unit that determines whether the focusing condition is assumed to be achieved in focus;
an image processor that executes at least one image processing routine among a plurality of different image processing routines for extracting an image corresponding to a particular image in the image captured by the image pickup device; and
a controller that selects the at least one image processing routine to be executed by the image processor, depending on whether the focusing condition is assumed to be achieved in focus, wherein
the at least one image processing routine executed by the image processor includes a face detection image processing for detecting a face image corresponding to a face of a person from the image captured by the image pickup device and a background detection image processing for detecting a background image corresponding to a background from the image captured by the image pickup device; and
the controller causes the image processor to execute the background detection image processing to detect the background image until the focus determination unit determines that the focusing condition is assumed to be achieved in focus, and
the controller causes the image processor to execute the face detection image processing to detect the face image when the focus determination unit determines that the focusing condition is assumed to be achieved in focus.

12. An imaging device, comprising:
an image pickup device that captures an image via imaging optics;
a focus detector that detects a focusing condition of the imaging optics;
a focus determination unit that determines whether the focusing condition is assumed to be achieved in focus;
an image processor that executes at least one image processing routine among a plurality of different image processing routines for extracting an image corresponding to a particular image in the image captured by the image pickup device; and
a controller that selects the at least one image processing routine to be executed by the image processor, depending on whether the focusing condition is assumed to be achieved in focus, wherein
the one or more image processing routine executed by the image processor includes a face detection image processing for detecting a face image corresponding to a face of a person from the image captured by the image pickup device and a background detection image processing for detecting a background image corresponding to a background from the image captured by the image pickup device; and
the controller causes the image processor to execute the face detection image processing to detect the face image after causing the image processor to execute the background detection image processing to detect the background image, when the focus determination unit determines that the focus condition is assumed to be achieved in focus.

13. An image detecting method, comprising:
capturing an image via imaging optics;
detecting a focusing condition of the imaging optics;
determining whether the focusing condition is assumed to be achieved in focus; and
detecting a background image corresponding to a background from the captured image until the focusing condition is determined to be assumed to be achieved in focus, and a face image corresponding to a face of a person from the captured image when the focusing condition is determined to be assumed to be achieved in focus.

14. An image detecting method, comprising:
capturing an image via imaging optics;
detecting a focusing condition of the imaging optics;
determining whether the focusing condition is assumed to be achieved in focus; and
detecting a face image corresponding to a face of a person from the captured image after detecting a background image corresponding to a background from the captured image, when the focusing condition is determined to be assumed to be achieved in focus.

15. An image detecting method, comprising:
capturing an image via imaging optics;
detecting a focusing condition of the imaging optics;
determining whether the focusing condition is assumed to be achieved in focus; and
executing a background detection processing to detect a background image corresponding to a background from the captured image until the focusing condition is determined to be assumed to be achieved in focus, and a face detection processing to detect a face image corresponding to a face of a person from the captured image when the focusing condition is determined to be assumed to be achieved in focus.

16. An image detecting method, comprising:
capturing an image via imaging optics;
detecting a focusing condition of the imaging optics;
determining whether the focusing condition is assumed to be achieved in focus; and
executing a face detection processing to detect a face image corresponding to a face of a person from the captured image after executing a background detection processing to detect a background image corresponding to a background from the captured image, when the focusing condition is determined to be assumed to be achieved in focus.

17. The image processing device according to claim 3, wherein
the image pickup device captures the image to be used for exposure computation but not for recording.

18. The image processing device according to claim 17, further comprising:
a recording image pickup device that captures an image for recording, the recording image pickup device being different from the image pickup device.

19. The image processing device according to claim 1, wherein
the image processor extracts a background image from the image captured by the image pickup device, by using color information.

20. The image processing device according to claim 1, further comprising:
a designation unit that designate at least one of a face image and a region other than a background image as a main object region.

21. The image processing device according to claim 1, further comprising:
a controller that controls a focus adjustment by using a focus detection result at a focusing area corresponding to at least one of a face image and a region other than a background image.

\* \* \* \* \*